(12) United States Patent
Heidemeyer et al.

(10) Patent No.: US 9,233,499 B2
(45) Date of Patent: Jan. 12, 2016

(54) FEED DEVICE FOR FEEDING FIBERS DURING THE PRODUCTION OF FIBER-REINFORCED PLASTICS MATERIALS

(71) Applicant: SKZ-KFE gGmbH Kunststoff-Forschung und-Entwicklung, Würzburg (DE)

(72) Inventors: Peter Heidemeyer, Kitzingen (DE); Christian Deubel, Kürnach (DE)

(73) Assignee: SKZ-KFE gGmbH Kunststoff-Forschung und-Entwicklung (DE)

( * ) Notice: Subject to any disclaimer, the term of this patent is extended or adjusted under 35 U.S.C. 154(b) by 0 days.

(21) Appl. No.: 14/431,325

(22) PCT Filed: Aug. 28, 2013

(86) PCT No.: PCT/EP2013/067825
§ 371 (c)(1),
(2) Date: Mar. 26, 2015

(87) PCT Pub. No.: WO2014/048667
PCT Pub. Date: Apr. 3, 2014

(65) Prior Publication Data
US 2015/0239166 A1   Aug. 27, 2015

(30) Foreign Application Priority Data
Sep. 27, 2012   (DE) .......................... 10 2012 217 579

(51) Int. Cl.
B65G 53/48   (2006.01)
B29C 47/10   (2006.01)
(Continued)

(52) U.S. Cl.
CPC ............ *B29C 47/1045* (2013.01); *B65G 33/18* (2013.01); *B65G 53/26* (2013.01)

(58) Field of Classification Search
USPC .................. 406/34, 56, 59, 87, 151; 110/105
See application file for complete search history.

(56) References Cited

U.S. PATENT DOCUMENTS

| | | | | |
|---|---|---|---|---|
| 954,944 A | * | 4/1910 | Dunn ..................... | B65G 53/08 110/105 |
| 3,014,485 A | * | 12/1961 | Karlsson ................. | A01F 12/48 209/717 |

(Continued)

FOREIGN PATENT DOCUMENTS

| | | |
|---|---|---|
| DE | 19754409 A1 | 6/1999 |
| DE | 20015369 U1 | 8/2001 |

(Continued)

OTHER PUBLICATIONS

International Search Report, Aug. 28, 2013, 10 pages.

(Continued)

*Primary Examiner* — Joseph Dillon, Jr.
(74) *Attorney, Agent, or Firm* — Reising Ethington P.C.

(57) ABSTRACT

A feed device for feeding fibers during the production of fiber-reinforced plastics materials has a multi-shaft screw machine for the lateral guidance of the fibers into a preparation system for producing fiber-reinforced plastics materials. The multi-shaft screw machine comprises a housing, a plurality of housing bores penetrating one another as well as screw shafts, which are rotatably drivable and are arranged therein, and a feed opening. A suction mechanism, which produces an airstream sucking in the fibers, is provided to suck the fibers through the feed opening into the housing bores. The fibers are filtered by means of a filter mechanism out of the airstream. In order to ensure a long service life, the filter mechanism has a plurality of flow channels, which have a widening cross section in a flow direction.

18 Claims, 9 Drawing Sheets

(51) Int. Cl.
*B65G 33/18* (2006.01)
*B65G 53/26* (2006.01)

(56) References Cited

U.S. PATENT DOCUMENTS

| | | | | |
|---|---|---|---|---|
| 4,635,566 A | * | 1/1987 | O'Connor | F23K 3/02 110/101 R |
| 4,924,784 A | * | 5/1990 | Lennon | F23D 1/02 110/106 |
| 5,255,790 A | | 10/1993 | Einoder et al. | |
| 5,279,631 A | | 1/1994 | Pingel | |
| 5,529,247 A | * | 6/1996 | Mleczewski | E01C 19/104 222/227 |
| 5,681,132 A | * | 10/1997 | Sheppard, Jr. | B65G 53/48 406/146 |
| 6,119,867 A | | 9/2000 | Ljokkoi et al. | |
| 6,336,774 B1 | * | 1/2002 | Dunlop | B60P 1/60 406/151 |
| 7,976,593 B2 | * | 7/2011 | Graham | C10J 3/30 110/105 |

FOREIGN PATENT DOCUMENTS

| | | |
|---|---|---|
| DE | 10201869 A1 | 7/2003 |
| DE | 202011105765 U1 | 12/2011 |
| DE | 202012002449 U1 | 5/2012 |
| WO | 2012093605 A2 | 7/2012 |

OTHER PUBLICATIONS

German Examination Report, Apr. 17, 2013, 4 pages.

* cited by examiner

FEED DEVICE FOR FEEDING FIBERS DURING THE PRODUCTION OF FIBER-REINFORCED PLASTICS MATERIALS

CROSS-REFERENCE TO RELATED APPLICATIONS

This application claims the priority of German Patent Application, Serial No. 10 2012 217 579.2, filed on 27 Sep. 2012, pursuant to 35 U.S.C. 119(a)-(d), the content of which is incorporated herein by reference in its entirety as if fully set forth herein.

FIELD OF THE DISCLOSURE

The disclosure relates to a feed device for feeding fibers during the production of fiber-reinforced plastics materials.

BACKGROUND

A feed device for feeding chips and short-cut fibers into an extruder for producing fiber-reinforced plastics materials is known from DE 102 01 869 A1. The feeding takes place by a mixer by means of a two-screw auxiliary extruder, which opens laterally into the extruder and conveys the short-cut fibers into the extruder. The short-cut fibers are sucked via a downpipe and a mixer by means of an airstream into the auxiliary extruder. For this purpose, a fan, which produces the fiber airstream, opens below the screw shafts into the housing of the auxiliary extruder. The fiber airstream is separated by a screen, the air being sucked out of the housing of the auxiliary extruder. To clean the screen, compressed air is fed below said screen via a line, the line being closable in the direction of the fan by the fed compressed air by means of a check valve.

SUMMARY

The device is based on the object of developing a feed device of the generic type in such a way that a simpler and more reliable feeding of fibers into a preparation system for producing fiber-reinforced plastics materials is possible. In particular, the feed device is to have a comparatively long service life.

This object is achieved by a feed device for feeding fibers during the production of fiber-reinforced plastics materials, comprising a multi-shaft screw machine for laterally feeding fibers into a preparation system for producing fiber-reinforced plastics materials with a housing, a plurality of housing bores penetrating one another, a plurality of screw shafts, which are concentrically arranged in the housing bores and are rotatably drivable about associated rotational axes, and a feed opening for feeding the fibers into the housing bores, a suction mechanism for sucking the fibers through the feed opening into the housing bores by means of an airstream, and a filter mechanism arranged between the suction mechanism and the housing bores to filter the fibers out of the airstream, with the filter mechanism forming a plurality of flow channels, which, in a flow direction, have a widening flow cross section. Since the flow channels of the filter mechanism in the flow direction have a widening flow cross section, the filter mechanism is effectively prevented from clogging. Fibers, which are sucked into one of the flow channels, because of the widening flow cross section find a comparatively slight hold there, so they are sucked through the respective flow channel because of the airstream and are removed via a suction line. Those fibers, which thus arrive in one of the flow channels, are sucked off through the filter mechanism, substantially unhindered. As a result, clogging of the filter mechanism is prevented in a simple and reliable manner. The dimensions of the flow channels are matched to the fibers to be conveyed, so, on the one hand, an adequately high airstream is present and fine dust particles are sucked off through the filter mechanism, but, on the other hand, the fibers to be conveyed cannot normally get through the filter mechanism. The feed device according to the invention is simply constructed and, because of the filter mechanism, has a high degree of reliability and a comparatively long service life. In particular, additional mechanisms for cleaning the filter mechanism and/or for sucking in the fibers, such as, for example, a stirrer, can be dispensed with.

A feed device for feeding fibers comprises a multi-shaft screw machine for laterally feeding fibers into a preparation system for producing fiber-reinforced plastics materials with a housing, a plurality of housing bores penetrating one another, a plurality of screw shafts, which are concentrically arranged in the housing bores and are rotatably drivable about associated rotational axes, and a feed opening for feeding the fibers into the housing bores, a suction mechanism for sucking the fibers through the feed opening into the housing bores by means of an airstream, and a filter mechanism arranged between the suction mechanism and the housing bores to filter the fibers out of the airstream.

The multi-shaft screw machine is preferably configured as a twin-shaft screw machine with screw shafts that are rotatably drivable in the same direction and mesh tightly with one another. By means of the feed mechanism, fibers can be fed in a dry state laterally into a preparation system for producing fiber-reinforced plastics materials. The preparation system is, for example, configured as a screw machine, in particular a single-shaft or multi-shaft screw machine or injection molding machine. The feed device according to the invention is suitable, in particular, for feeding long-cut fibers. The fibers to be conveyed or long-cut fibers have, in particular, a fiber length of 2 mm to 100 mm and in particular from 15 mm to 50 mm. The multi-shaft screw machine is configured, in particular, for lateral feeding of the preparation system.

A feed device in which the flow channels widen in a step-shaped manner in each case ensures a long service life of the filter mechanism. Fibers, which arrive in one of the flow channels, can be removed from the filter mechanism substantially unhindered owing to the step-shaped configuration.

A feed device in which the flow channels in each case have a first channel portion with a minimal first channel width $B_1$, within the following range: $0.01 \text{ mm} \leq B_1 \leq 0.4 \text{ mm}$ and in particular $0.05 \text{ mm} \leq B_1 \leq 0.2 \text{ mm}$, ensures that, on the one hand, fibers normally do not arrive in one of the flow channels and, on the other hand, the flow resistance of the filter mechanism is comparatively small for the airstream.

A feed device in which the flow channels in each case have a first channel portion and a second channel portion arranged downstream in the flow direction with a minimal second channel width $B_2$, within the following range: $0.5 \text{ mm} \leq B_2 \leq 3.0 \text{ mm}$ and in particular $0.8 \text{ mm} \leq B_2 \leq 2.0 \text{ mm}$, ensures that, on the one hand, fibers arriving in one of the flow channels can be removed unhindered from the filter mechanism and, on the other hand, the installation space available for the filter mechanism is optimally used and a comparatively low flow resistance for the airstream is achieved.

A feed device in which the flow channels are in each case gap-like and run transverse to a conveying direction of the multi-shaft screw machine ensures a low flow resistance and a comparatively long service life of the filter mechanism. Since the flow channels are gap-like, they have a comparatively large cross sectional area, so a small flow resistance is achieved. At the same time, an entry of the fibers into the flow channels is made more difficult by the course of the flow channels transverse to the conveying direction of the fibers.

A feed device in which the filter mechanism has a plurality of filter elements resting on one another and adjacent filter elements in each case form a gap-like flow channel ensures a simple and modular structure of the filter mechanism. The filter mechanism is constructed from a large number of similarly formed filter elements, which are joined together to form the filter mechanism. The filter elements thus form a filter package. A filter mechanism or filter package with any desired filter length can easily be formed by the filter elements. The filter elements arranged in a package-like manner are installed in a suction opening of the housing of the multi-shaft screw machine. The number of filter elements depends on the required filter length and the construction size of the multi-shaft screw machine. For example, at least 10, in particular at least 20, and in particular at least 30 filter elements are arranged one after the other in the conveying direction.

A feed device in which the filter elements have a base plate in each case, on which at least one filter web running transverse to the flow direction and at least two spacers are arranged, and in that the at least two spacers have a larger width than the at least one filter web to form a flow channel ensures a modular construction of the filter mechanism. A filter element rests with the at least two spacers against the base plate of an adjacent filter element so a gap-like first channel portion is formed between the filter web of the one filter element and the base plate of the other filter element and a gap-like second channel portion is formed between the base plates of the adjacent filter elements. The first channel portion has a minimal first channel width, which is smaller than a minimal second channel width of the second channel portion. The flow cross section of the flow channel formed between the adjacent filter elements therefore widens in the flow direction. The filter web in the conveying direction preferably has a width, which is less than 2.0 mm, in particular less than 1.5 mm and in particular less than 1.0 mm. The filter web preferably has the shape of two part circular arcs, which have a circular shape corresponding to the housing bores. The respective base plate in the conveying direction preferably has a width, which is less than 1.5 mm, in particular less than 1.0 mm and in particular less than 0.5 mm. A small flow resistance is achieved by this with a comparatively small installation space of the filter mechanism.

A feed device in which the filter mechanism is formed from a metal ensures a simple and reliable structure of the filter mechanism. Since the filter mechanism is formed from metal or the filter elements are formed from metal, the filter mechanism or the filter elements can be formed with comparatively small wall thicknesses so the filter mechanism has a comparatively small flow resistance while having a small installation space. Moreover, the filter mechanism has a high temperature resistance. The metal is, in particular, steel or aluminum.

A feed device in which a suction opening, which is arranged offset with respect to the feed opening in a conveying direction of the multi-shaft screw machine, is formed in the housing ensures a long service life of the filter mechanism. Since the suction opening is arranged offset with respect to the feed opening in the conveying direction, the fibers are already deflected in the conveying direction during the feeding, so entry into one of the flow channels is made more difficult.

A feed device in which the filter mechanism is arranged in the housing, in particular in the suction opening and, in the region of the housing bores, has a cross sectional shape corresponding to them reliably ensures a conveyance of the sucked-in fibers in the conveying direction. Since the filter mechanism is arranged in the housing or in the suction opening formed in the housing, the filter mechanism directly delimits the housing bores. Since the filter mechanism has a cross sectional shape corresponding to the housing bores, only a comparatively small gap is formed between the filter mechanism and the screw shafts so the fibers located on the filter mechanism because of the suction can be easily and reliably stripped off by the screw shafts and transported away in the conveying direction from the filter mechanism. The filter mechanism is preferably constructed from a plurality of filter elements arranged one after the other in the conveying direction, said filter elements in each case having a filter web with the cross sectional shape of the housing bores.

A feed device in which a pressure sensor for monitoring the air pressure is arranged in a suction line running between the filter mechanism and the suction mechanism reliably detects a clogging of the filter mechanism. If the filter mechanism is clogged because of fine dust and/or sucked-in fibers, a reduced air pressure in the suction line can be detected by means of the pressure sensor. Measured values for the air pressure can be evaluated by means of a control mechanism which, in the case of a reduced air pressure, emits a warning signal. The feed device can then be maintained at optimal time intervals.

A feed device in which a fiber filter is arranged in a suction line running between the filter mechanism and the suction mechanism ensures a long service life of the suction mechanism. Fibers removed from the filter mechanism cannot reach the suction mechanism but are filtered out by means of the fiber filter before the suction mechanism. The same applies to fine dust particles. The fiber filter is preferably changed at regular time intervals so a clogging of the fiber filter is avoided. The fiber filter may, for example, be part of a filter changing mechanism, in which two fiber filters are arranged that can easily be exchanged for one another.

A feed device in which a monitoring sensor is provided to monitor a plastics material melt back-up reliably ensures detection of a plastics material melt back-up from the preparation system. The monitoring sensor may, for example, be configured as a pressure sensor and/or as a temperature sensor and/or as a torque sensor and/or as a current or power consumption sensor. If plastics material melt from the preparation system enters the housing bores of the multi-shaft screw machine through the discharge opening, an increased pressure and/or an increased temperature is detected in the housing bores, for example, by means of the monitoring sensor. In addition or alternatively, the entry of plastics material melt into the housing bores can be detected by a direct or indirect measurement of the torque of the multi-shaft screw machine. The torque may, for example, be detected directly by means of a torque sensor or indirectly by means of a current or power consumption sensor, which detects the drive power consumed of the multi-shaft screw machine. In addition, by monitoring the torque, the currently conveyed fiber quantity and the consistency of the conveyance can be monitored by means of the metering time. Moreover, a possible fiber jam in the multi-shaft screw machine can be detected. A back-up of the plastics material melt can be reliably recognized so counter-measures can be introduced on time before the plastics material melt reaches the filter mechanism.

A feed device in which the feed opening in a conveying direction of the multi-shaft screw machine is delimited by an inlet element, which forms an inlet wall with an angle $\alpha$ relative to the conveying direction, within the following range: $5° \leq \alpha \leq 20°$, reliably ensures an intake of the fibers into the multi-shaft screw machine. The intake of non-flowable fibers that are hooked to one another, which are present in a pellet-like manner, is improved by the inlet element or its inlet geometry. The inlet element is preferably exchangeably arranged on the housing so the angle of the inlet wall can easily be adapted to the fibers to be conveyed by an exchange of the inlet element. Alternatively, the inlet element may be a fixed part of the housing of the multi-shaft screw machine. The inlet element has a cross sectional shape corresponding to the housing bores. The inlet wall forms an inlet bevel, which is preferably linear, viewed in the conveying direction or in longitudinal section, so the inlet element forms an intake wedge or inlet wedge tapering in the conveying direction. The inlet bevel runs out flush with the housing bores. The screw shafts in the intake region preferably have a higher flight volume, so the intake behavior is improved. As a result, the fibers arrive more easily in the screw flight or the screw shafts and are conveyed better. The higher flight volume is, for example, achieved by single-flight screw elements with a pitch of at least 1.2 to 1.8 times the screw diameter.

A feed device in which a cutting mechanism for cutting continuous fibers into fibers with an adjustable fiber length is arranged upstream of the multi-shaft screw machine reliably ensures the metering and feeding of cut fibers or fibers cut with an adjustable fiber length. As a result, a wide area of use of the feed device is ensured. In particular, by means of the direct feeding of the cut fibers into the multi-shaft screw machine by means of the cutting mechanism, a mixer can be dispensed with. In principle, the cutting mechanism can be configured in any desired manner as long as it allows a defined cutting or breaking of continuous fibers with a predefined fiber length.

Further features, advantages and details of the invention emerge from the following description of an embodiment.

DESCRIPTION OF THE PREFERRED EMBODIMENT

Figure 1:
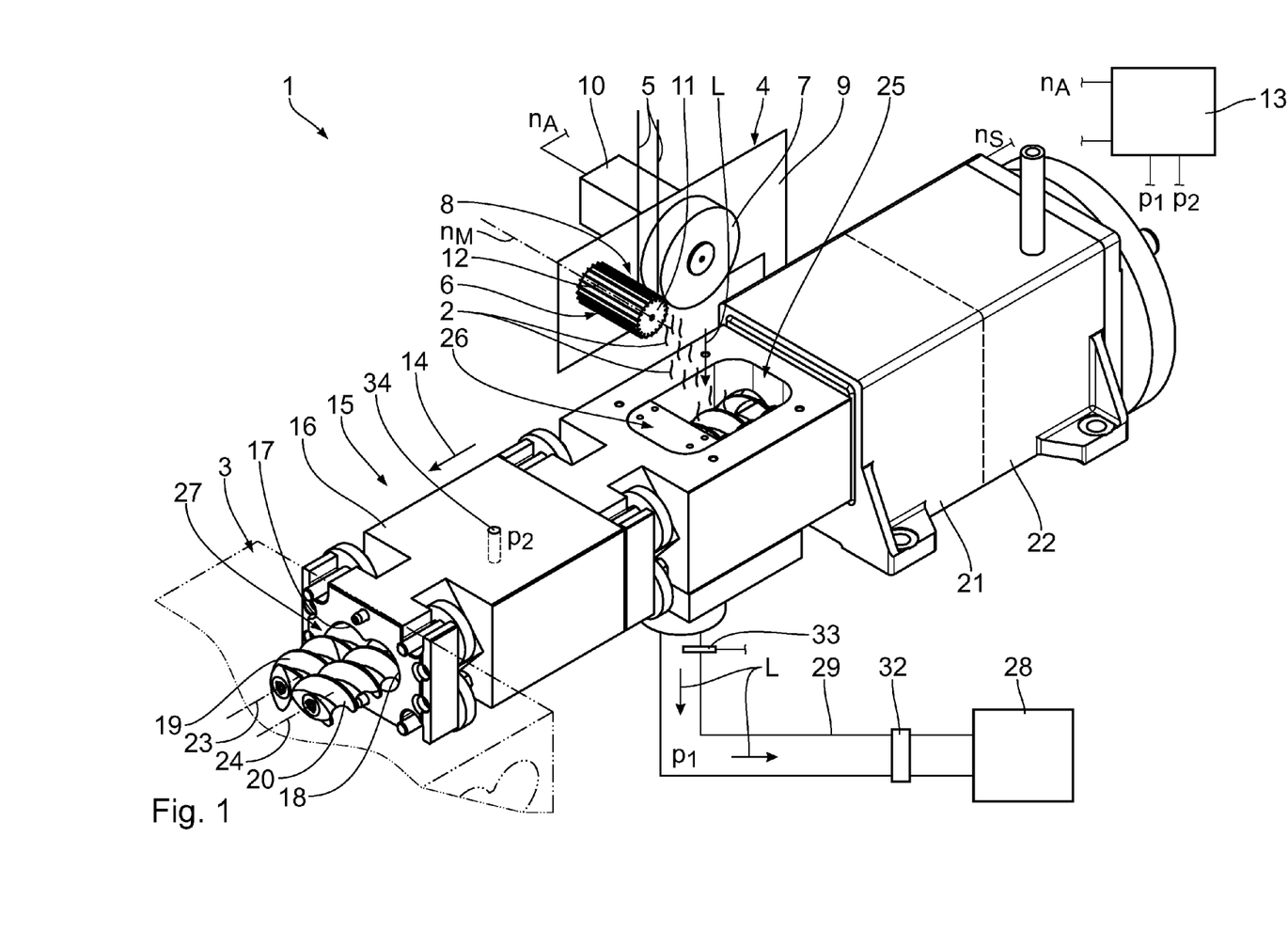
FIG. 1 shows a schematic view of a feed device for feeding cut fibers into a preparation system for producing fiber-reinforced plastics materials.
Figure 4:
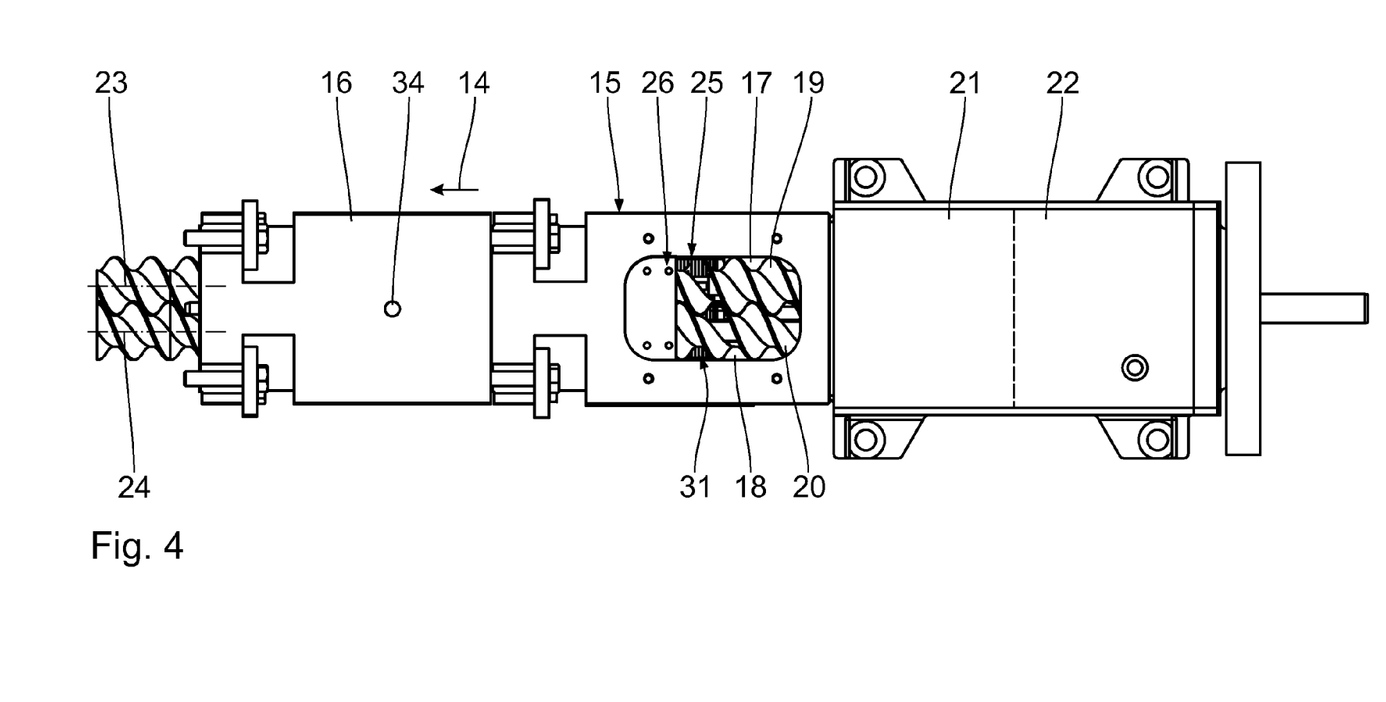
FIG. 4 shows a plan view of the twin-shaft screw machine in FIG. 2.
Figure 5:
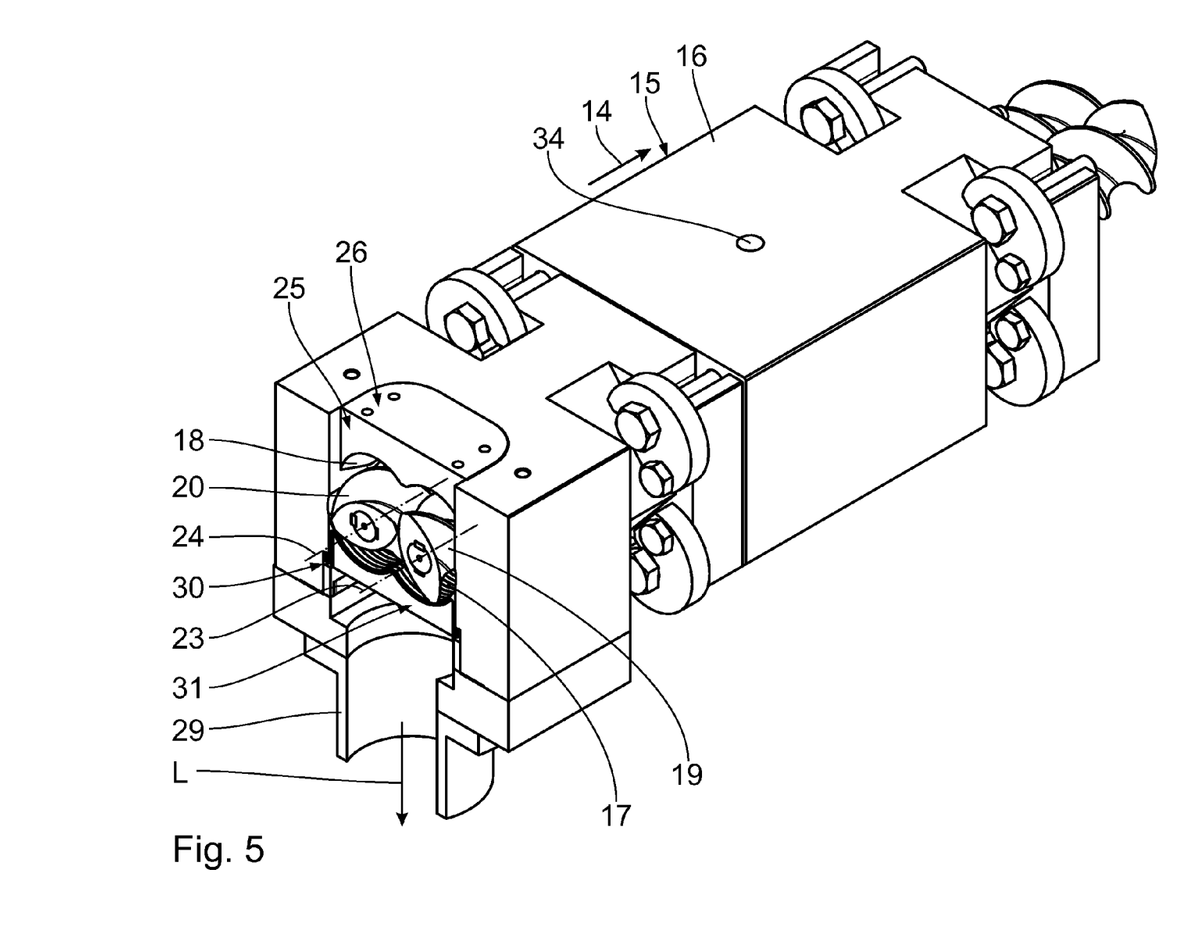
FIG. 5 shows a perspective cross section through the twin-shaft screw machine in FIG. 2 in the region of a filter mechanism.

A feed device 1 shown as a whole in FIG. 1 is used for feeding cut fibers 2 into a preparation system 3, which is in turn used for producing fiber-reinforced plastics materials. The preparation system 3 is, for example, configured as a twin-screw extruder as best shown in FIGS. 4 and 5, or as an injection molding machine or as any desired other plastics material preparation machine. The feed device 1 is fastened on the side of the preparation system 3 to feed the fibers 2.

The feed device 1 has a cutting mechanism 4, which is used to cut continuous fibers 5. The cut fibers 2 are produced by cutting the continuous fibers 5. The cutting mechanism 4, to cut the continuous fibers 5, has a cutting element 6 and a pressing element 7, which are roll-shaped and delimit a gap 8. The cutting element 6 and the pressing element 7 are rotatably mounted on a base frame 9, wherein the pressing element 7 is rotatably drivable by means of an associated drive motor 10. To cut the continuous fibers 5, the cutting element 6 has a roller-shaped base body 11, on which a plurality of cutting blades 12 are fastened, distributed over the periphery. The drive motor 10 is activated by means of a control mechanism 13 so the rotational drive speed $n_A$ can be adjusted. The cutting element 6 rests against the pressing element 7 so the latter co-rotates upon a rotation of the pressing element 7 at a rotational speed $n_M$ corresponding to the rotational drive speed $n_A$. As a result, the quantity of the fibers 2 produced can be adjusted or metered. The fiber length of the fibers 2 can be adjusted by means of the number or the spacing of the cutting blades 12. Fibers 2 with a fiber length of 2 mm to 100 mm, in particular from 15 mm to 50 mm, are preferably produced by means of the cutting mechanism 4. The continuous fibers 5 are fed to the cutting mechanism 4 by means of a spool or spools, not shown in more detail. The contact pressure between the cutting element 6 and the pressing element 7 can be adjusted in that the cutting element 6 can be displaced relative to the pressing element 7. As a result, a plurality of continuous fibers 5 can be cut simultaneously, in particular when the distance between the fiber rovings or spools and the cutting mechanism 4 is comparatively long.

A two-shaft screw machine 15 is arranged downstream of the cutting mechanism 4. The two-shaft screw machine 15 defines a conveying direction 14 of the cut fibers 2. The two-shaft screw machine 15 is used for the lateral feeding of the fibers 2 into the preparation system 3 and is accordingly also called a side feed machine. The screw machine 15 has a housing 16, in which a first housing bore 17 and a second housing bore 18 penetrating this are formed. The housing bores 17, 18 run parallel to one another and intersect along a common side. Alternatively, the housing bores 17, 18 may run conically with respect to one another. A respective associated screw shaft 19 or 20 is arranged concentrically to the housing bore 17 or 18 in the housing bores 17, 18. The screw shafts 19, 20 are rotatably drivable in the same direction, in other words in the same rotational directions, about a respective associated rotational axis 23 or 24 by a branching gearing 21 by means of a drive motor 22. The rotational speed $n_S$ of the screw shafts 19, 20 can be adjusted by means of the control mechanism 13.

To feed the fibers 2 cut by means of the cutting mechanism 4, a feed opening 25 is formed on an upper side of the housing 16 facing the cutting mechanism 4. The feed opening 25 is delimited in the conveying direction 14 by an inlet element 26. The inlet element 26 will be described in more detail below. To discharge the fibers 2 from the screw machine 15, the housing bores 17, 18 on the end face of the housing 16 form a discharge opening 27.

To suck the fibers 2 into the screw machine 15, the feed device 1 has a suction mechanism 28. The suction mechanism 28 is connected by a suction line 29 to a suction opening 30, which is formed in the housing 16. The suction mechanism 28 and the suction line 29 are shown only schematically in FIG. 1.

Figure 2:
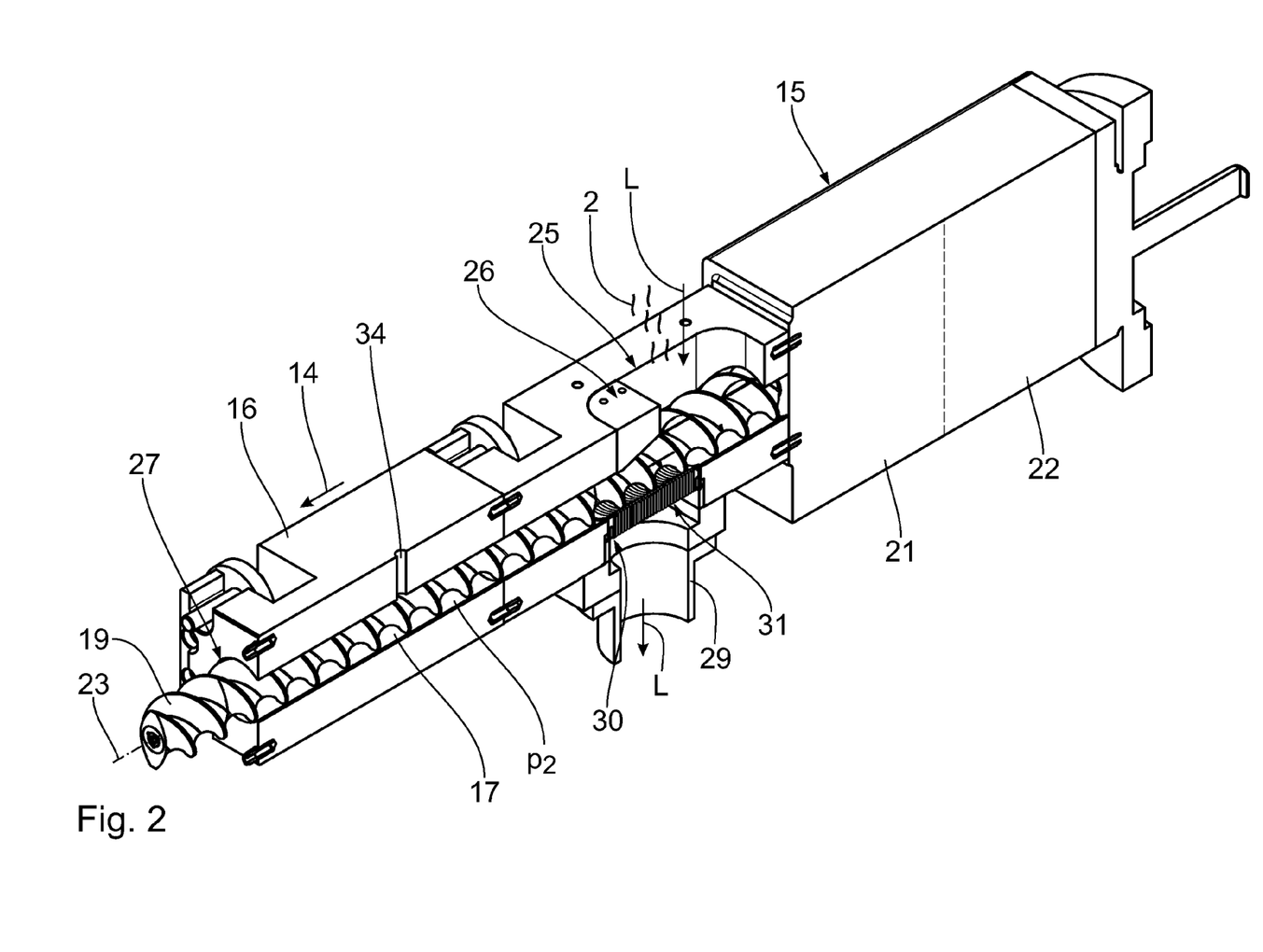
FIG. 2 shows a perspective longitudinal section through a twin-shaft screw machine of the feed device in FIG. 1.
Figure 3:
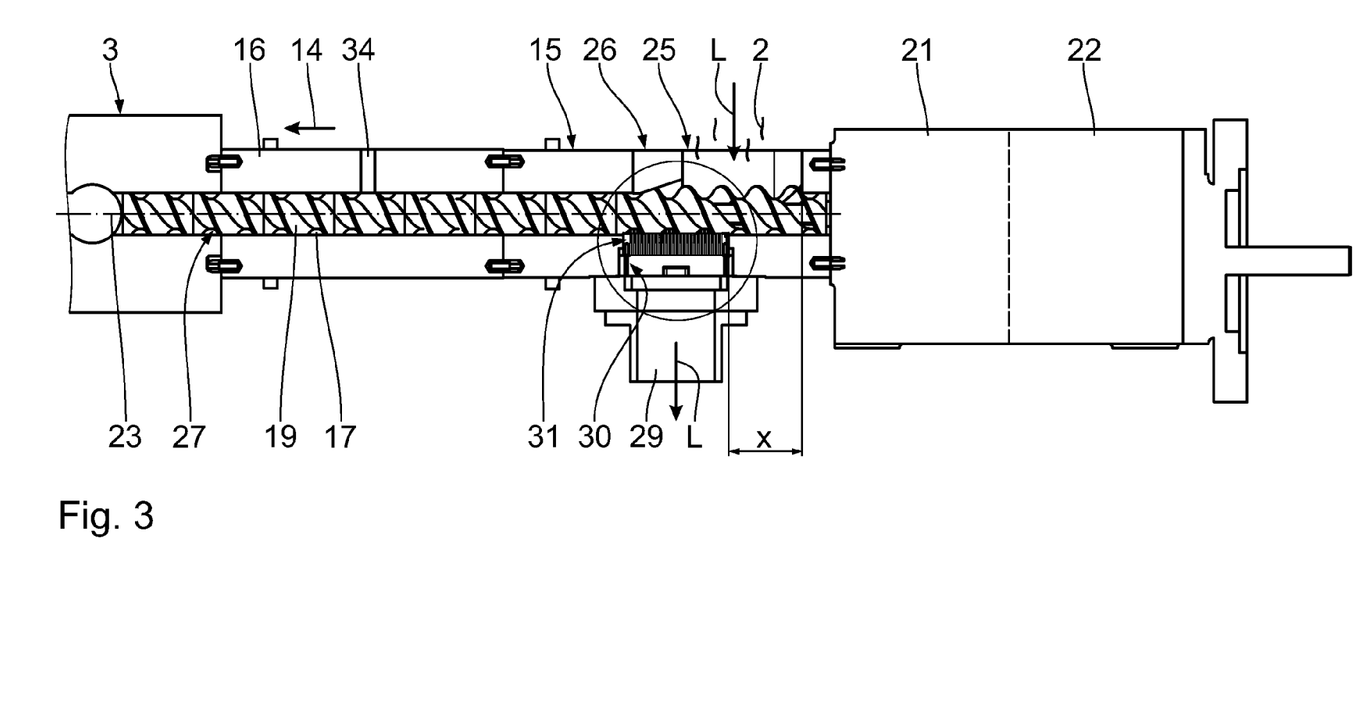
FIG. 3 shows a side view of the longitudinal section in FIG. 2.

The suction opening 30 is formed on a lower side of the housing 16 opposing the feed opening 25 and arranged, in the conveying direction 14 or in the direction of the rotational axes 23, 24, offset with respect to the feed opening 25 by a spacing x. An air stream L, which runs through the feed opening 25, the housing bores 17, 18, the suction opening 30 and the suction line 29, can be produced by the suction mechanism 28. To prevent entry of the fibers 2 sucked up by means of the air stream L into the suction line 29, a filter mechanism 31 is arranged in the suction opening 30 in order to filter the fibers 2 out of the air stream L. The filter mechanism 31 is shown in FIGS. 2, 3, and 4 and is described in detail below.

To protect the suction mechanism 28 from fibers 2, which arrive in the suction line 29 through the filter mechanism 31, a fiber filter 32 is arranged in the suction line 29. The fiber filter 32 can easily be exchanged and is, in particular, part of a filter exchange mechanism, not shown in more detail, which, by a simple linear displacement, allows an exchange of a fiber filter 32 for a new fiber filter 32. In order to detect clogging of the filter mechanism 31 and/or the fiber filter 32, a first pressure sensor 33 for monitoring the air pressure $p_1$ between the filter mechanism 31 and the fiber filter 32 is arranged in the suction line 29. The pressure sensor 33 has a signal connection to the control mechanism 13, which evaluates the measured values for the air pressure $p_1$. Moreover, a second pressure sensor 34 or a monitoring sensor, which measures the pressure $p_2$ in the housing bores 17, 18, is arranged in the housing 16 between the fiber discharge opening 27 and the filter mechanism 31. The second pressure sensor 34 has a signal connection to the control mechanism 13, which evaluates the measured values for the pressure $p_2$. The second pressure sensor 34 is used to detect a back-up of the plastics material located in the preparation system 3 through the discharge opening 27 counter to the conveying direction 14 into the housing bores 17, 18.

Figure 6:
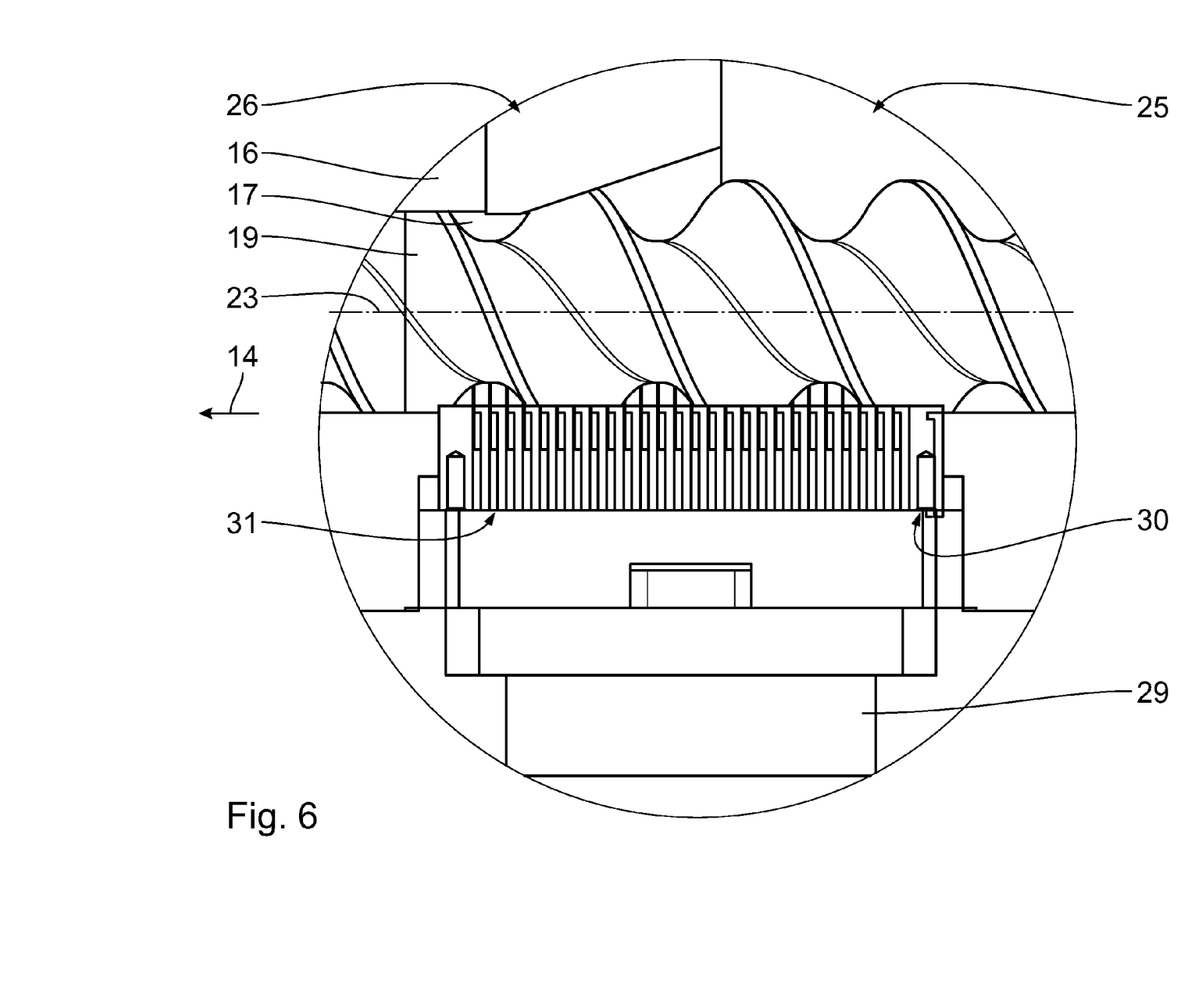
FIG. 6 shows an enlarged side view of the twin-shaft screw machine in FIG. 3 in the region of the filter mechanism.
Figure 7:
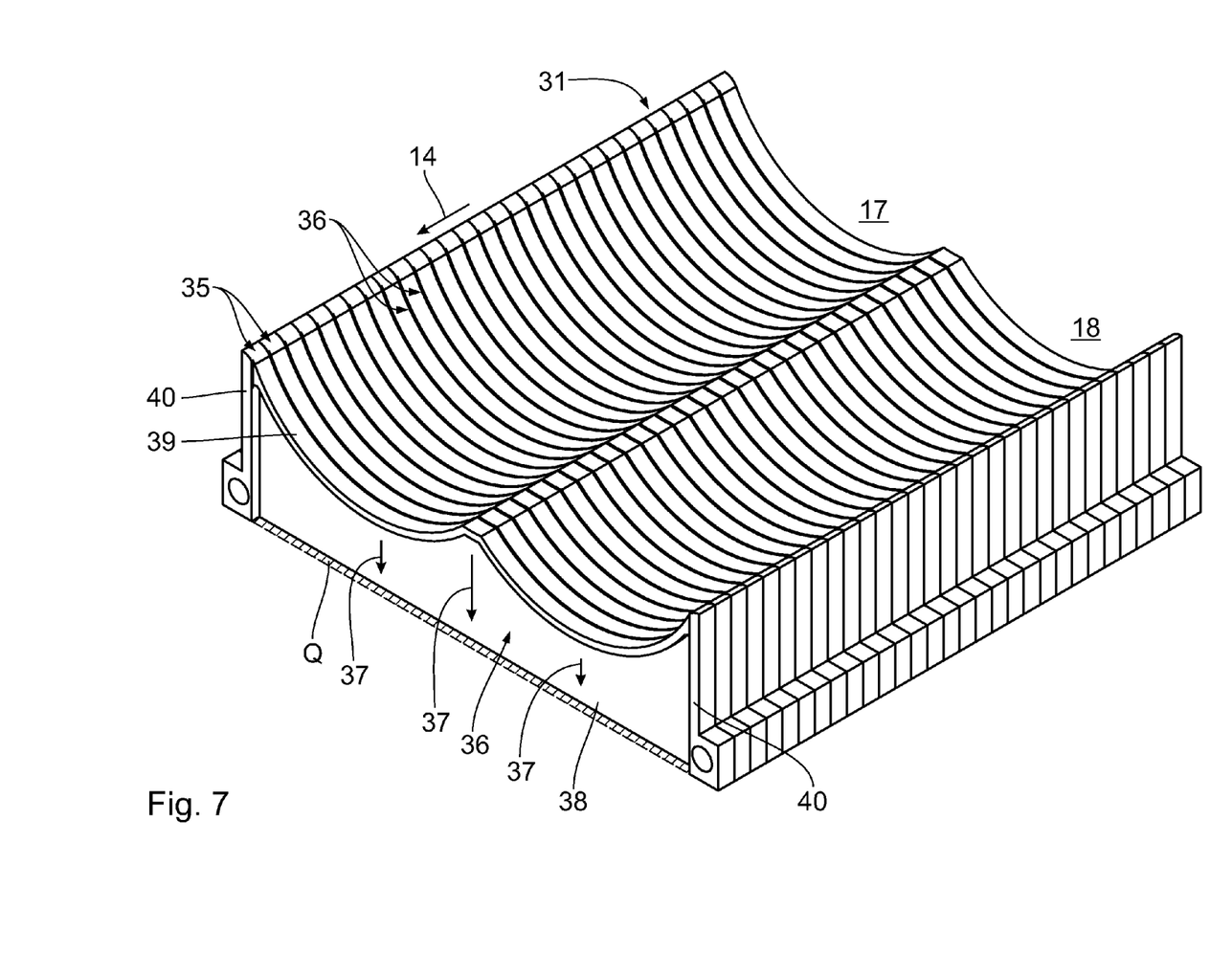
FIG. 7 shows a perspective view of the filter mechanism constructed from a plurality of filter elements.

As shown in FIGS. 6 and 7, the filter mechanism 31 is constructed from a plurality of similar filter elements 35, which are arranged one after the other in the conveying direction 14 or in the direction of the rotational axes 23, 24. The filter elements 35 are formed from a metal, preferably of steel or aluminium. Two adjacent filter elements 35 in each case delimit a gap-like flow channel 36, the cross section of which runs substantially transverse to the conveying direction 14. The last filter element 35 in the conveying direction 14, with the housing 16, delimits a corresponding flow channel 36. The flow channels 36, in a flow direction 37 running perpendicular to the conveying direction 14, have a widening flow cross section Q.

Figure 8:
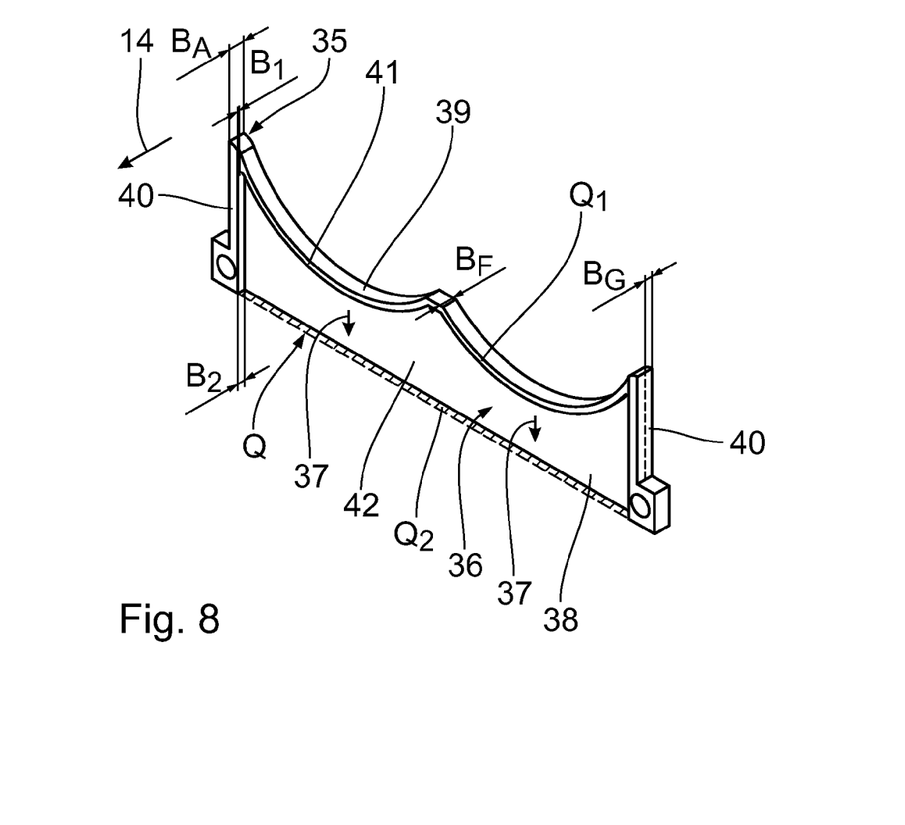
FIG. 8 shows a perspective view of a filter element in FIG. 7.
Figure 9:
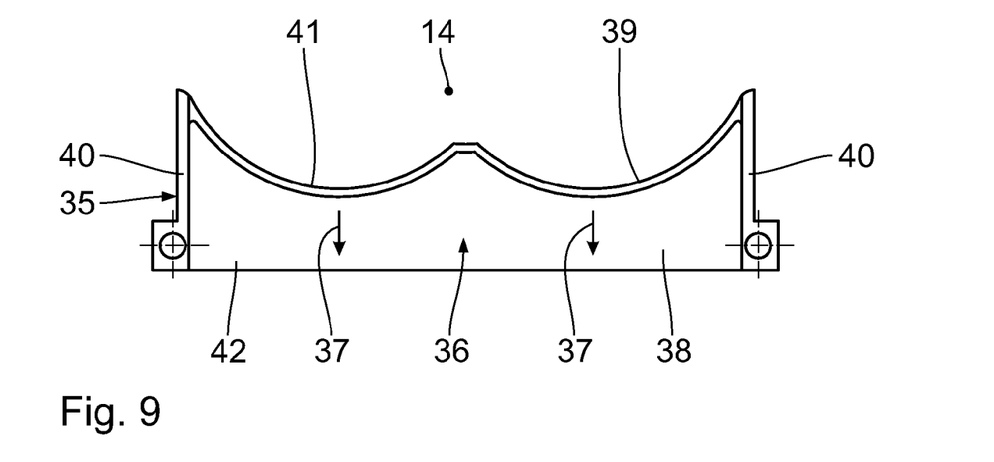
FIG. 9 shows a front view of the filter element in FIG. 8.

As best seen in FIGS. 8 and 9, each of the filter elements 35, to form the associated flow channel 36, has a base plate 38, on which a filter web 39 is arranged on a side facing the housing bores 17, 18 and two spacers 40 are arranged to the side thereof. The filter web 39 runs transverse to the conveying direction 14 to form the gap-like flow channel 36. In order to allow the fibers 2 to be stripped off cleanly from the filter mechanism 31 or the filter webs 39, the filter webs 39 and the base plates 38 have a cross sectional shape corresponding to the housing bores 17, 18. The spacers 40 are web-shaped and arranged on the side of the associated filter web 39 so they run in the flow direction 37 and laterally delimit the associated flow channel 36. The spacers 40 in the conveying direction 14 have a width $B_A$, which is greater than a width $B_F$ of the associated filter web 39 and greater than a width $B_G$ of the associated base plate 38 in the conveying direction 14. If a filter element 35 rests with its spacers 40 against the base plate 38 of an adjacent filter element 35, the associated flow channel 36 is formed by this.

Since the width $B_F$ of the filter web 39 is greater than the width $B_G$ of the base plate 38, the flow cross section Q of the respective flow channel 36 widens in a step-shaped manner in the flow direction 37. The respective flow channel 36 has a first channel portion 41, the cross section $Q_1$ of which is delimited by the filter web 39 and the spacers 40 and the base plate 38 of the adjacent filter element 35. The first channel portion 41, in the conveying direction 14, has a minimal first channel width $B_1$, which is produced from the difference between the widths $B_A$ and $B_F$. The channel width $B_1$ is in the following range: 0.01 mm≤$B_1$≤0.04 mm and in particular 0.05 mm≤$B_1$≤0.2 mm. Arranged downstream of the first channel portion 41 in the flow direction 37 is a second channel portion 42, which has a minimal second channel width $B_2$, which is produced from the difference between the widths $B_A$ and $B_G$. The channel width $B_2$ is in the following range: 0.5 mm≤$B_2$≤3.0 mm and in particular 0.8 mm≤$B_2$≤2.0 mm. The cross section $Q_2$ of the second channel portion 42 is delimited by the base plate 38 and the spacers 40 of a filter element 35 and the base plate 38 of the adjacent filter element 35. The width $B_G$ is in the following range: $B_G$≤1.5 mm, in particular $B_G$≤1.0 mm and in particular $B_G$≤0.5 mm.

Figure 10:
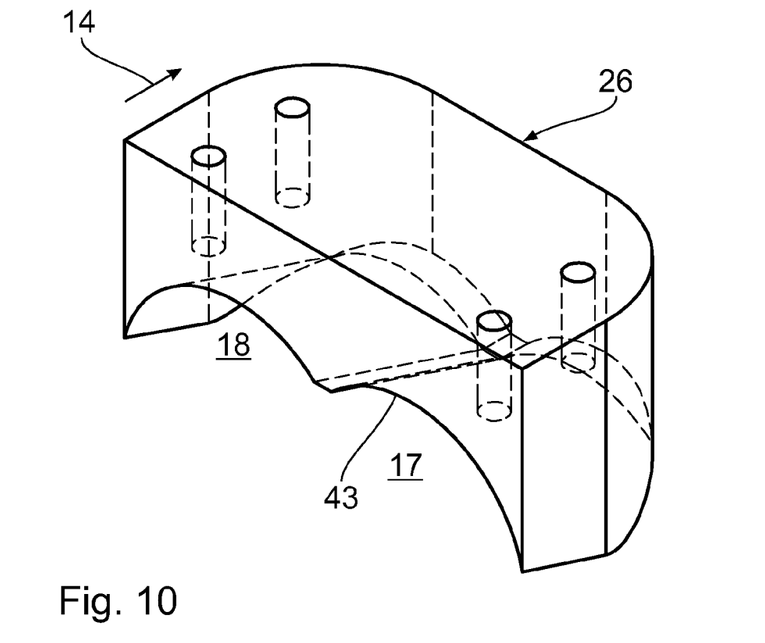
FIG. 10 shows a perspective view of an inlet element of the twin-shaft screw machine in FIG. 2.
Figure 11:
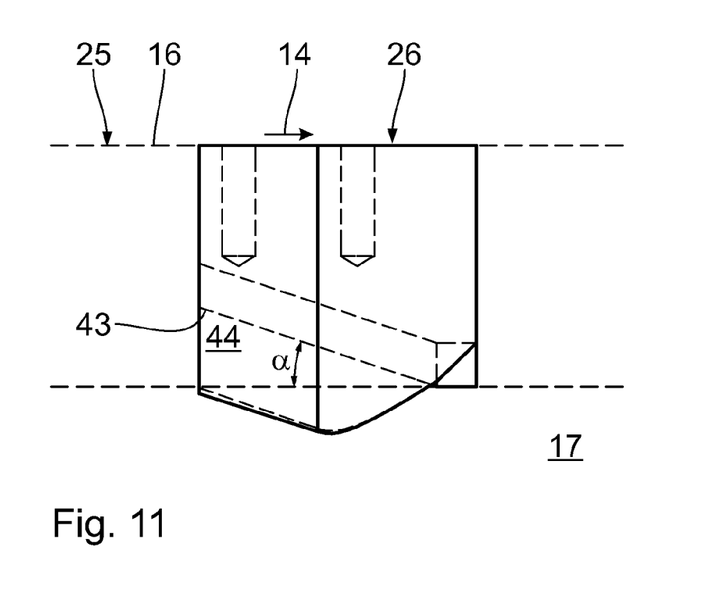
FIG. 11 shows a side view of the inlet element in FIG. 10.

The inlet element 26 as shown in FIGS. 10 and 11 is used to improve the intake behavior of the screw machine 15. The inlet element 26 has an inlet wall 43 facing the housing bores 17, 18 as best seen in FIGS. 2 and 3. The inlet wall 43 forms—viewed in a vertical longitudinal section parallel to the rotational axes 23 or 24—a linearly running inlet bevel. The inlet wall 43, with the conveying direction 14, encloses—viewed in the vertical longitudinal section—an angle α, in the following range: 5°≤α≤20°. The inlet element 26, in the region of the inlet wall 43, therefore forms an inlet wedge 44, which tapers in the conveying direction 14. Viewed in cross section, the inlet wall 43 has a cross sectional shape corresponding to the housing bores 17, 18, so the inlet wall 43 runs out flush with the housing bores 17, 18. The inlet element 26 is exchangeably fastened on the housing 16.

The mode of functioning of the feed device system 1 is as follows:

The continuous fibers 5 provided are firstly cut by means of the cutting mechanism 4 to form fibers 2 with a desired fiber length. The fiber length is preferably between 2 mm and 100 mm and in particular between 5 mm and 50 mm. A metering of the fibers 2 is possible due to the rotational speeds $n_A$ or $n_M$. The cut fibers 2 are sucked in by the airstream L, which is produced by means of the suction mechanism 28, through the feed opening 25 into the housing bores 17, 18.

The airstream L runs through the feed opening 25, the housing bores 17, 18, the filter mechanism 31 arranged in the suction opening 30, the suction line 29 and the fiber filter 32 to the suction mechanism 28. Since the suction opening 30 is arranged offset with respect to the feed opening 25 by the spacing x as shown on FIG. 3, the fibers 2 entrained by the airstream L are already deflected in the conveying direction 14 during the sucking in process. Because of the inlet bevel formed by the inlet wall 43 as shown on FIGS. 10 and 11, fibers 2 can be deflected early in the conveying direction 14 and captured by the screw shafts 18, 20 and conveyed in the direction of the discharge opening 27. The remaining fibers are sucked past the screw shafts 19, 20 to the filter mechanism 31, where the fibers 2 are separated from the airstream L. The fibers 2 coming to rest on the filter mechanism 31, because of the cross sectional shape of the filter mechanism 31 corresponding to the housing bores 17, 18, are stripped off there-from by the screw shafts 19, 20 and transported away in the conveying direction 14. For this purpose, the screw shafts 19, 20 in a region called the intake region between the feed opening 25 and the end of the filter mechanism 31 located in the conveying direction 14 and shown in detail on FIGS. 2, 3, and 6, have a higher flight volume compared to the remaining part of the screw shafts 19, 20. The fibers 2 thus arrive more easily in the screw flights and are conveyed better in the conveying direction 14. The higher flight volume is, for example, achieved by single-flight screw elements with a pitch of at least 1.2 to 1.8 times the screw diameter. The light, non-flowable and comparatively long fibers 2 are sucked under the screw shafts 19, 20 by the airstream L or the suction conveyance, whereby the fibers 2 can be captured by the screw shafts 19, 20 and conveyed.

Because of the configuration of the flow channels 36, a clogging of the filter mechanism 31 is effectively prevented, so the filter mechanism 31 is robust and reliable and has a long service life. Since the gap-like flow channels 36 run transverse to the conveying direction 14 in cross section, the fibers 2 are oriented with their fiber length in the direction of the minimal channel width $B_1$ of the first channel portions 41. As a result, the probability of a fiber 2 entering the first channel portion 41 is reduced. Fibers 2 which nevertheless enter one of the first channel portions 41, can be sucked because of the wider second channel portion 42 from the first channel portion 41 and be removed from the filter mechanism 31. A clogging of the filter mechanism 31 is therefore prevented. The fibers 2 sucked through the filter mechanism 31 are filtered out of the air stream L by means of the fiber filter 32.

Referring to FIG. 1, the pressure sensor 33 measures the air pressure $p_1$ in the suction line 29 and transmits the measured values to the control mechanism 13, which evaluates them. If the air pressure $p_1$ in the suction line 29 increases, the control mechanism 13 recognizes that the fiber filter 32 has a comparatively high flow resistance and has to be exchanged. The control mechanism 13 emits a corresponding monitoring signal. If the air pressure $p_1$ in the suction line 29 in contrast reduces, the control mechanism 13 recognizes that the filter mechanism 31 has a comparatively high flow resistance and has to undergo maintenance. The control mechanism 13 emits a corresponding monitoring signal in this case.

The pressure sensor 34 measures the pressure $p_2$ in the housing bores 17, 18. If plastics material escapes from the preparation system 3 through the discharge opening counter to the conveying direction 14 into the housing bores 17, 18, there is a risk of the plastics material or plastics material melt clogging the filter mechanism 31. The control mechanism 13 evaluates the measured values of the pressure $p_2$ and recognizes when plastics material has reached the position of the pressure sensor 34. The control mechanism 13 in this case emits a corresponding warning signal. An operator can introduce counter-measures because of the warning signal.

Because of the feed device 1 according to the invention, fibers 2 or cut fibers with an adjustable fiber length can be produced by means of the cutting mechanism 4 and fed in a defined manner dry, in other words without plasticized plastics material, via the two-shaft screw machine 15 to a melt-guiding or plastics material-guiding preparation system 3. The preparation system 3 is, for example, configured as a single-screw or twin-screw machine, in particular as an extruder or injection molding machine. The fibers 2 fed to the preparation system 3 can thus be incorporated directly into a plastics material or matrix polymer in order to produce granules, semi-finished products and/or molded parts in a downstream manufacturing step. The fibers 2 are reinforcement fibers, such as, for example, carbon fibers, plastics material fibers, glass fibers and/or natural fibers. Using the feed device 1 according to the invention, a feeding of long cut fibers is possible, in particular, which have a very small bulk density and only a very poor flowability or none and are correspondingly difficult to meter, draw in and to convey. The feed device 1 is suitable for preparation systems 3, which are operated continuously, such as, for example, extrusion or compounding systems, or which are operated discontinuously, such as, for example, injection molding machines.

Having thus described the invention, various modifications and alterations will be apparent to those skilled in the art, which modifications and alterations are intended to be within the scope of the invention as defined by the appended claims.

The invention claimed is:

1. A feed device for feeding fibers during the production of fiber-reinforced plastics materials, the feed device comprising:
   a multi-shaft screw machine for laterally feeding fibers into a preparation system for producing fiber-reinforced plastics materials, the multi-shaft screw machine comprising:
      a housing;
      a plurality of housing bores penetrating one another;
      a plurality of screw shafts, concentrically arranged in the housing bores and rotatably drivable about associated rotational axes; and,
      a feed opening for feeding the fibers into the housing bores;
   wherein the feed device comprises a suction mechanism for sucking the fibers through the feed opening into the housing bores by means of an airstream; and,
   a filter mechanism arranged between the suction mechanism and the housing bores to filter the fibers out of the airstream, wherein the filter mechanism forms a plurality of flow channels in a flow direction, and wherein said plurality of flow channels have a widening flow cross section.

2. A feed device according to claim 1, wherein the flow channels widen in a step-shaped manner.

3. A feed device according to claim 1, wherein the flow channels have a first channel portion with a minimal first channel width $B_1$, and wherein $0.01$ mm$\leq B_1 \leq 0.4$ mm.

4. A feed device according to claim 3, wherein $0.05$ mm$\leq B_1 \leq 0.2$ mm.

5. A feed device according to claim 1, wherein the flow channels have a first channel portion and a downstream second channel portion with a minimal second channel width $B_2$, and wherein $0.5$ mm$\leq B_2 \leq 3.0$ mm.

6. A feed device according to claim 5, wherein $0.8$ mm$\leq B_2 \leq 2.0$ mm.

7. A feed device according to claim 1, wherein the flow channels are gap-like and run transverse to a conveying direction of the multi-shaft screw machine.

8. A feed device according to claim 1, wherein the filter mechanism has a plurality of filter elements resting on one another and adjacent filter elements form a gap-like flow channel.

9. A feed device according to claim 8, wherein each of the filter elements have a base plate, at least one filter web running transverse to the flow direction and at least two spacers, wherein the at least two spacers have a larger width than the at least one filter web to form a flow channel between adjacent filter elements.

10. A feed device according to claim 1, wherein the filter mechanism is formed from metal.

11. A feed device according to claim 1 further comprising: a suction opening formed in the housing, the suction opening being offset with respect to the feed opening in a conveying direction of the multi-shaft screw machine.

12. A feed device according to claim 1, wherein the filter mechanism is arranged in the housing, said filter mechanism in the region of the housing bores having a cross sectional shape corresponding to a cross sectional shape of the housing bores.

13. A feed device according to claim 12, wherein the filter mechanism is arranged in the suction opening.

14. A feed device according to claim 1, wherein a pressure sensor for monitoring the air pressure is arranged in a suction line running between the filter mechanism and the suction mechanism.

15. A feed device according to claim 1, wherein a fiber filter is arranged in a suction line running between the filter mechanism and the suction mechanism.

16. A feed device according to claim 1, wherein a monitoring sensor is provided to monitor a plastics material melt back-up.

17. A feed device according to claim 1, wherein the feed opening in a conveying direction of the multi-shaft screw machine is delimited by an inlet element, said inlet element forming an inlet wall with an angle α relative to the conveying direction, and wherein $5° \leq \alpha \leq 20°$.

18. A feed device according to claim 1, wherein a cutting mechanism for cutting continuous fibers into fibers with an adjustable fiber length is arranged upstream of the multi-shaft screw machine.

\* \* \* \* \*